(12) United States Patent
Cowperthwaite

(10) Patent No.: US 7,694,986 B2
(45) Date of Patent: Apr. 13, 2010

(54) VEHICLES HAVING STABILIZATION AND STABILIZERS FOR VEHICLES

(76) Inventor: Mark S. Cowperthwaite, 55 Madison Dr., Naples, ME (US) 04055

( * ) Notice: Subject to any disclaimer, the term of this patent is extended or adjusted under 35 U.S.C. 154(b) by 78 days.

(21) Appl. No.: 11/655,350

(22) Filed: Jan. 19, 2007

(65) Prior Publication Data
US 2008/0174087 A1      Jul. 24, 2008

(51) Int. Cl.
*B62K 17/00*      (2006.01)
(52) U.S. Cl. .............. 280/282; 280/281.1; 280/87.041
(58) Field of Classification Search .............. 280/281.1, 280/282, 87.041
See application file for complete search history.

(56) References Cited

U.S. PATENT DOCUMENTS

| | | | | |
|---|---|---|---|---|
| 3,237,961 A | * | 3/1966 | McMullen ........... 280/124.103 |
| 3,504,934 A | * | 4/1970 | Wallis ......................... 280/282 |
| 3,677,541 A | * | 7/1972 | Race .............................. 472/26 |
| 3,893,666 A | * | 7/1975 | Parsons ........................ 472/21 |
| 4,087,106 A | * | 5/1978 | Winchell ................. 280/14.28 |
| 4,279,429 A | | 7/1981 | Hopkins et al. |
| 4,432,561 A | | 2/1984 | Feikema et al. |
| 4,575,070 A | * | 3/1986 | Kinberg et al. ................ 472/24 |
| 4,592,441 A | | 6/1986 | Marier et al. |
| 4,903,857 A | | 2/1990 | Klopfenstein |
| 5,354,084 A | * | 10/1994 | Lofgren et al. .............. 280/250 |
| 5,616,104 A | * | 4/1997 | Mulenburg et al. ........... 482/57 |
| 5,941,548 A | | 8/1999 | Owsen |
| 6,378,879 B2 | * | 4/2002 | Rappaport ............. 280/87.041 |
| 6,402,174 B1 | * | 6/2002 | Maurer ........................ 280/267 |
| 6,478,104 B1 | * | 11/2002 | Kemper ....................... 180/214 |
| 6,572,130 B2 | | 6/2003 | Greene, Jr. et al. |
| 6,739,606 B2 | * | 5/2004 | Rappaport ............. 280/87.041 |
| 6,976,687 B2 | * | 12/2005 | Beleski, Jr. ............ 280/87.041 |
| 7,192,038 B2 | * | 3/2007 | Tsai ....................... 280/87.041 |
| 2007/0007745 A1 | * | 1/2007 | Shim et al. .................. 280/282 |

FOREIGN PATENT DOCUMENTS

FR      2807729  A1      10/2001

OTHER PUBLICATIONS

"TTW—Tilting Three Wheelers: Human Powered TTWs," http://www.maxmatic.com/ttw_hpv.htm, accessed Jul. 7, 2006, 5 pages.

* cited by examiner

*Primary Examiner*—Lesley Morris
*Assistant Examiner*—Tashiana Adams
(74) *Attorney, Agent, or Firm*—Preti Flaherty Beliveau & Pachios LLP

(57) ABSTRACT

A stabilizer includes a base and a shaft rotatively mounted to the base. An arm attached to the shaft is able to swing about the axis of rotation defined by the shaft in response to centrifugal force. In one possible application, the stabilizer can be incorporated into a vehicle. The vehicle includes a first frame and a second frame pivotally connected to the first frame, wherein the frames pivot with respect to one another about an axis of rotation. The second frame includes an outwardly extending support arm having a seat mounted thereon. The arm swings in response to centrifugal force so as to laterally displace the seat relative to the first frame. In one aspect, the seat is located below the axis of rotation.

1 Claim, 4 Drawing Sheets

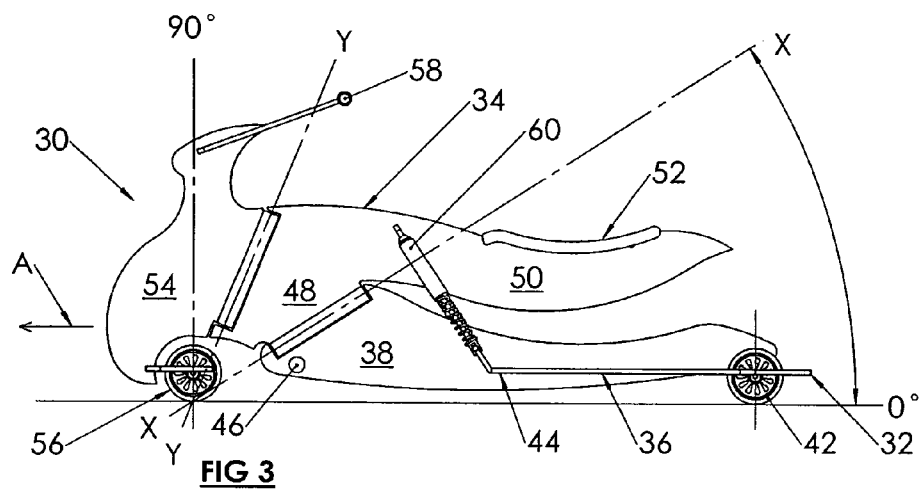
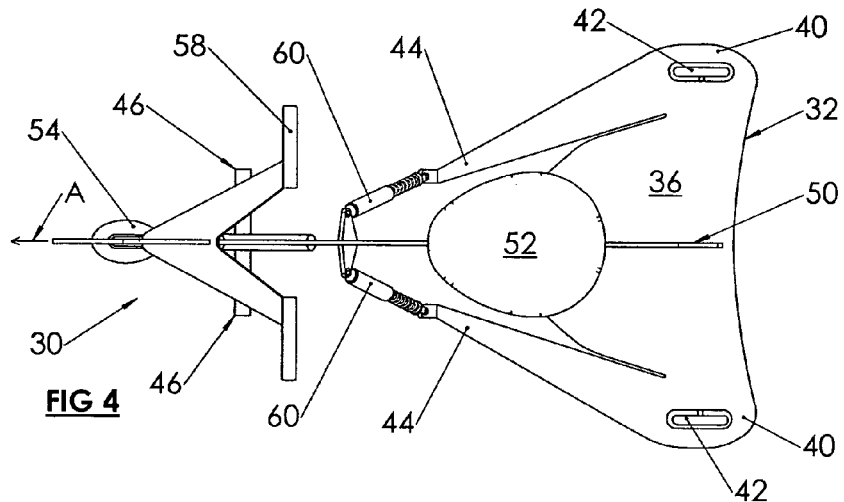
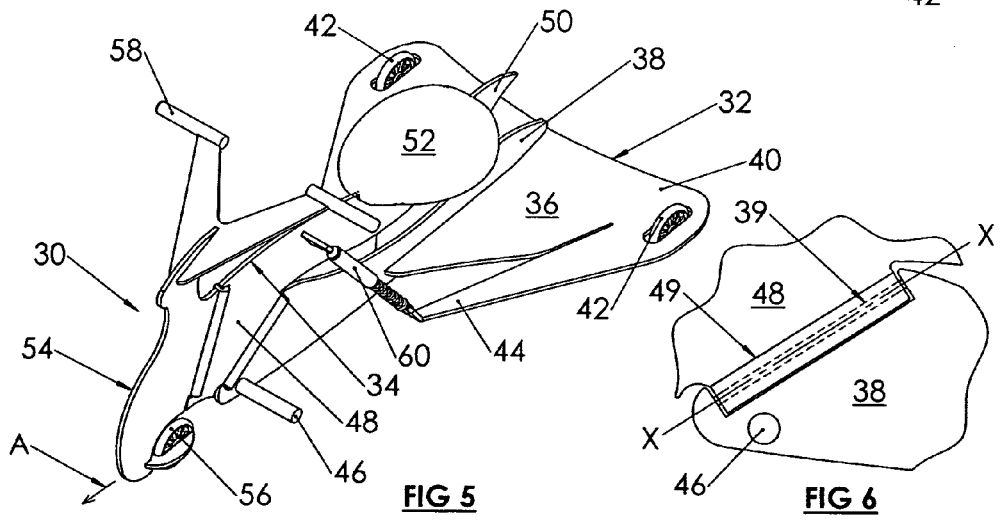

VEHICLES HAVING STABILIZATION AND STABILIZERS FOR VEHICLES

BACKGROUND OF THE INVENTION

This invention relates generally to stabilizers for vehicles and vehicles having stabilizing means.

Stability is an issue with all manner of vehicles. Whenever a vehicle is moving in a circular or curved path, such as during a turning maneuver, inertia will resist the change in direction and create an apparent outward-acting force commonly referred to as centrifugal force. Centrifugal force increases with greater speeds and tighter turning radii. As a result of centrifugal force, a turning vehicle can tip or even rollover in extreme cases.

Many efforts have been made to enhance vehicle stability and counter the effects of centrifugal force. Many off these efforts involve costly systems that use elaborate electronic controls. Other approaches utilize simpler mechanical designs but typically require an operator to manually activate the stabilization.

Accordingly, it would be desirable to have a simple, passive means for stabilizing vehicles.

SUMMARY OF THE INVENTION

The above-mentioned need is met by the present invention, one embodiment of which includes a stabilizer having a base and a shaft rotatively mounted to the base. An arm attached to the shaft is able to swing about the axis of rotation defined by the shaft in response to centrifugal force.

In one possible application, the invention includes a vehicle having a first frame and a second frame pivotally connected to the first frame, wherein the frames pivot with respect to one another about an axis of rotation. The second frame includes an outwardly extending support arm having a seat mounted thereon. The arm swings in response to centrifugal force so as to laterally displace the seat relative to the first frame. In one aspect, the seat is located below the axis of rotation.

The present invention and its advantages over the prior art will be more readily understood upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

FIG. 3 is a side view of an exemplary embodiment of a vehicle having stabilization means.

FIG. 4 is a top view of the vehicle of FIG. 3.

FIG. 5 is a perspective view of the vehicle of FIG. 3.

FIG. 6 shows an enlarged view of a portion of the vehicle of FIG. 3.

DETAILED DESCRIPTION OF THE INVENTION

Figure 1:
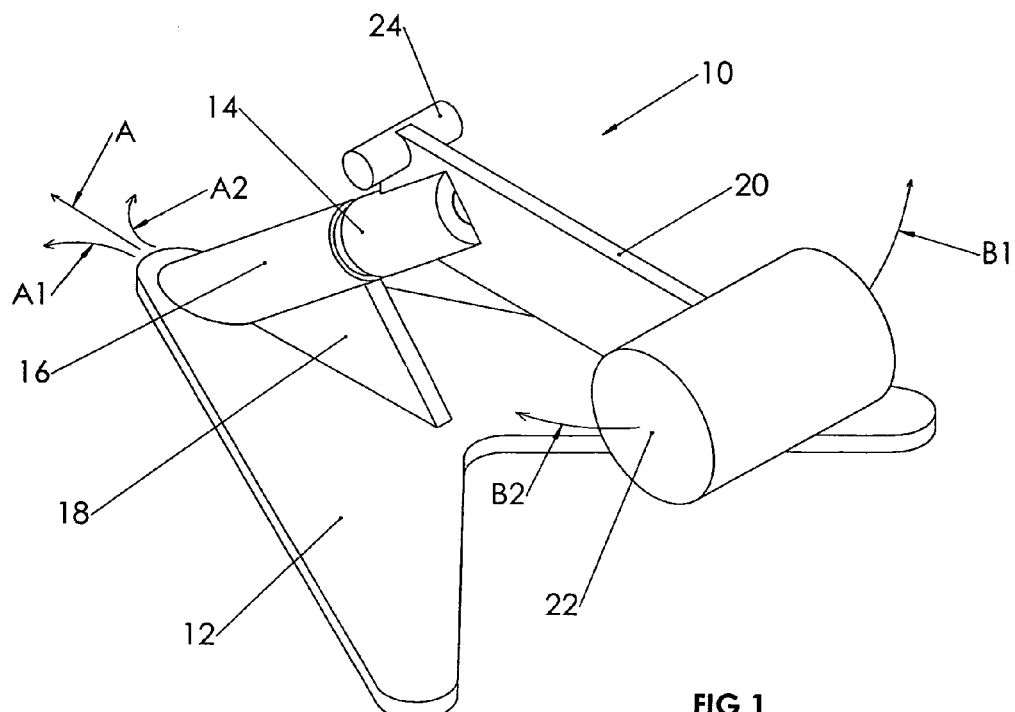
FIG. 1 is a perspective view of one embodiment of a stabilizer useful in stabilizing a vehicle.
Figure 2:
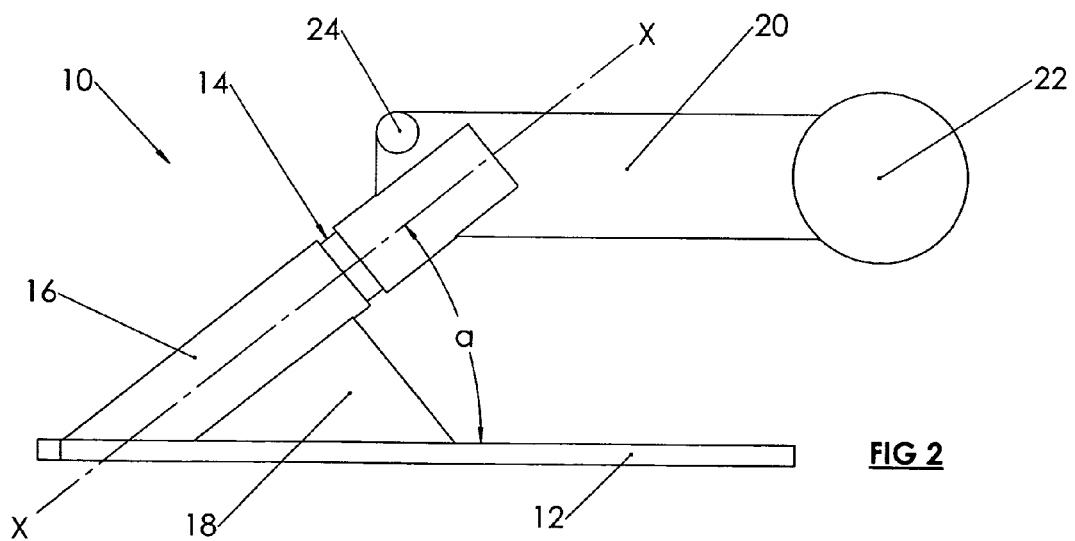
FIG. 2 is a side view of the stabilizer of FIG. 1.

Referring to the drawings wherein identical reference numerals denote the same elements throughout the various views, FIGS. 1 and 2 show an apparatus 10 that utilizes centrifugal force to do work or accomplish a task. For example, the apparatus 10 is useful in stabilizing vehicles, including but not limited to automobiles, trains and other wheeled vehicles as well as non-wheeled vehicles such as boats and airplanes to name a few. Accordingly, the apparatus 10 is also referred to herein as a stabilizer.

In the illustrated embodiment, the apparatus or stabilizer 10 includes a base 12 having a pivot shaft 14 rotatively mounted thereto. The pivot shaft 14 is received within a bearing sleeve 16 fixedly attached to the base 12 and is capable of freely rotating within the bearing sleeve 16 about an axis of rotation X-X, which is coincident with the longitudinal axes of the pivot shaft 14 and the bearing sleeve 16. The base 12 can take a wide variety of shapes but will generally define a planar surface. The bearing sleeve 16 is supported by a bracket 18 at an acute angle relative to the plane defined by the base 12. The axis of rotation X-X thus defines an acute angle a relative to the planar surface of the base 12. Alternatively, the angle a could be equal to 90 degrees, but an acute angle is generally preferred for reasons to be described below. The bearing sleeve 16 is also oriented so that axis of rotation X-X lies in a plane that is perpendicular to the planar surface of the base 12 (i.e., the plane of the paper in FIG. 2). This plane is referred to herein as the "equilibrium plane." As shown in FIGS. 1 and 2, the bracket 18 is a planar piece that is parallel to this equilibrium plane.

A support arm 20 is attached at a first or proximal end thereof to the outer end of the pivot shaft 14. The support arm 20 extends outward from the pivot shaft 14 away from the axis of rotation X-X, substantially parallel to the base 12. A mass 22 is attached to a second or distal end of the support arm 20 so as to be spaced a given distance from the axis of rotation X-X. An actuator 24 is mounted to the proximal end of the support arm 20, above the pivot shaft 14.

In use, the stabilizer 10 can be mounted to, or incorporated into, a vehicle such that when the vehicle turns, the resultant centrifugal force can be utilized to help stabilize the vehicle (and/or do other work). Preferably, although not necessarily, the stabilizer 10 will be oriented on the vehicle so that the base 12 and the support arm 20 are substantially horizontal. Thus, when angle a is an acute angle, the axis of rotation X-X is inclined from vertical toward the mass 22 such that the mass 22 is positioned below the axis of rotation X-X. When the vehicle is traveling in a straight direction, represented by arrow A in FIG. 1, the stabilizer 10 will assume an equilibrium position in which the support arm 20 lies in the equilibrium plane. However, if the vehicle turns from its straight path to move along a curved path, centrifugal force will cause the support arm 20 to pivot or swing about the axis of rotation X-X and laterally displace the mass 22. The degree of the arm swing is proportional to the centrifugal force, which in turn is proportional to factors such as the turning radius and vehicle speed while turning.

If the vehicle turns to the left (as represented by arrow $A_1$ in FIG. 1), the support arm 20 will swing outward to the right or away from the turn (as represented by arrow $B_1$). The mass 22 is laterally displaced to the right of the equilibrium plane. Conversely, if the vehicle turns to the right (as represented by arrow $A_2$), the support arm 20 will swing outward to the left or away from the turn (as represented by arrow $B_2$). The mass 22 is laterally displaced to the left of the equilibrium plane. In addition to being laterally displaced to the left or the right, the mass 22 will also be displaced vertically because of the axis of rotation X-X being inclined. Accordingly, when the vehicle completes the turn and resumes traveling in a straight direction (or comes to rest), gravity will cause the support arm 20 and the mass 22 to return to the equilibrium position.

When centrifugal force causes the support arm 20 to swing outward and displace the mass 22, the actuator 24 is displaced in the direction opposite that of the mass 22. The displaced actuator 24 can be used to actuate a means for doing work. For example, hydraulic switches (not shown) could be placed in the path of the actuator 24 so as to be engaged by and activated when the actuator 24 is displaced. In another example, the actuator 24 could activate spring assemblies, such as those described in more detail below. These are just a few examples of the many applications that could be mechanically activated by the actuator 24.

Referring to FIGS. 3-6, a three-wheeled vehicle 30 is shown as an exemplary embodiment of one application of the apparatus for doing work described above. The vehicle 30 comprises a rear frame 32 and a forward frame 34 pivotally connected to the rear frame 32 so that the rear and front frames 32 and 34 are able to pivot with respect to one another about an axis of rotation X-X. The rear frame 32 includes a flat section 36 and an elongated upright section 38 fixedly attached to the flat section 36. The upright section 38 is perpendicular to the flat section 36 and extends lengthwise along the middle of the flat section 36, with the front portion protruding forward of the flat section 36. The upright section 38 defines a front edge along which the rear frame 32 is pivotally connected to the forward frame 34. The flat section 36 includes left and right wings 40. A rear wheel 42 is rotatively mounted in each wing 40 so that the rear frame supports two wheels. The flat section 36 further includes left and right forward-extending mounting flanges 44. Two footrests 46, one on each side, are attached to the lower front corner of the upright section 38 and extend laterally outward. It should be noted that while the vehicle 30 depicted in the drawings does not have an on-board means of propulsion, the present invention is equally applicable to vehicles that do have propulsion means such as a motor, a pedal drive, or the like.

The forward frame 34 is a generally L-shaped member having a main section 48 and a support arm 50 that extends rearward from the upper rear corner of the main section 48 and behind the axis of rotation X-X. The support arm 50 extends substantially horizontally and overlies the upright section 38 of the rear frame 32 when in its equilibrium position, which is described below. A seat 52, in which an operator of the vehicle 30 can sit, is mounted on the support arm 50 at or near its distal end. Although it can be oriented vertically, the axis of rotation X-X is preferably inclined with respect to vertical. As shown, the axis of rotation X-X is in front of and inclined toward the seat 52 so that the seat 52 is located below the axis of rotation X-X.

The main section 48 defines a back edge below the support arm 50 which engages the above-mentioned front edge of the upright section 38 to form the pivotal connection between the rear frame 32 and the forward frame 34. As best seen in FIG. 6, one possible embodiment of this pivotal connection comprises a pin 39 mounted along the front edge of the upright section 38 and a bearing sleeve 49 fixedly attached to the back edge of the main section 48, although the placement of the pin and sleeve could be reversed. The pin 39 is rotatively received within the bearing sleeve 49 to allow the rear and forward frames 32 and 34 to pivot relative to one another.

A steering subframe 54 is pivotally connected to the forward frame 34. The main section 48 of the forward frame 34 defines a front edge along which the subframe 54 is pivotally connected. A front wheel 56 is rotatively mounted to the bottom of the subframe 54, and a set of handlebars 58 is fixedly attached to the top of the subframe 54 to extend rearward toward the seat 52. Thus, a rider sitting in the seat 52 can manipulate the handlebars 58 to turn the subframe 54 relative to the forward frame 34 (about an axis of rotation Y-Y) and thereby steer the vehicle 30.

Figure 7:
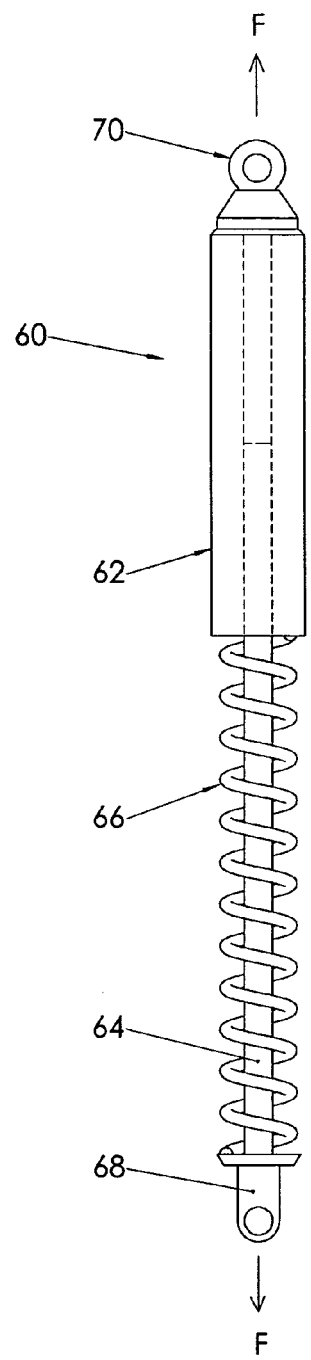
FIG. 7 shows a spring assembly.
Figure 8:
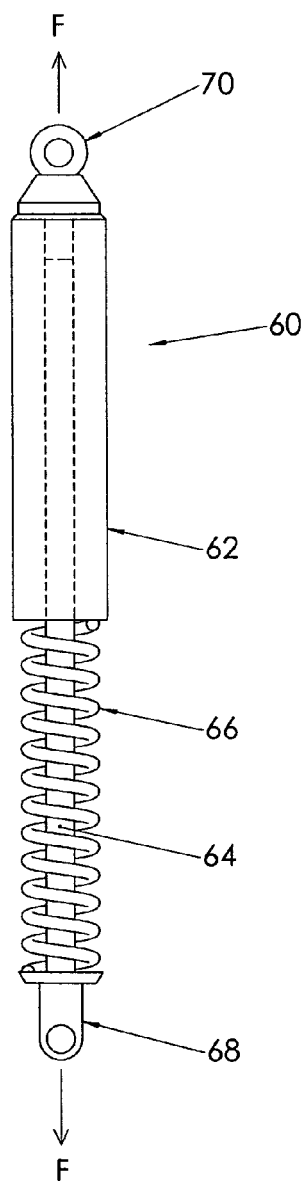
FIG. 8 shows the spring assembly of FIG. 7 in a further compressed state.

The vehicle 30 further includes a pair of telescopic spring assemblies 60, one disposed on the left side of the vehicle 30 and the other disposed on the right side. Each spring assembly 60 is pivotally connected at one end to the forward frame 34 and at the other end to corresponding mounting flange 44 so as to extend between the rear and forward frames 32 and 34. The connection point to the forward frame 34 is spaced a predetermined distance forward of the axis of rotation X-X. Referring to FIGS. 7 and 8, each spring assembly 60 comprises a cylinder 62 having an internal bore, a rod 64 arranged to slide in and out of the cylinder bore, and a compression spring 66 disposed over the rod 64. A first mounting lug 68 having a bolt hole is formed on the outer end of the rod 64 for connecting this end of the spring assembly 60 to one of the rear and forward frames 32 and 34, and a second mounting lug 70 having a bolt hole is formed on the outer end of the cylinder 62 for connecting this end of the spring assembly 60 to the other frame. The compression spring 66 is compressed between the first mounting lug 68 and the inner edge of the cylinder 62 to exert opposing axial forces F on the cylinder 62 and the rod 64. When the rod 64 is moved further into the cylinder 62, as shown in FIG. 8, the spring 66 is compressed further, thereby increasing the spring force and the axial force F.

Figure 9:
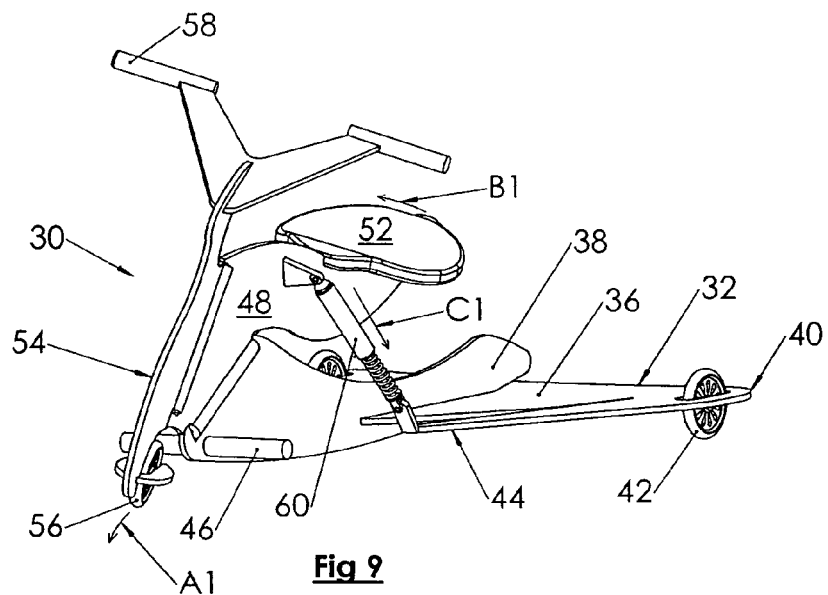
FIG. 9 shows a perspective view of the vehicle of FIG. 3 making a left turn.
Figure 10:
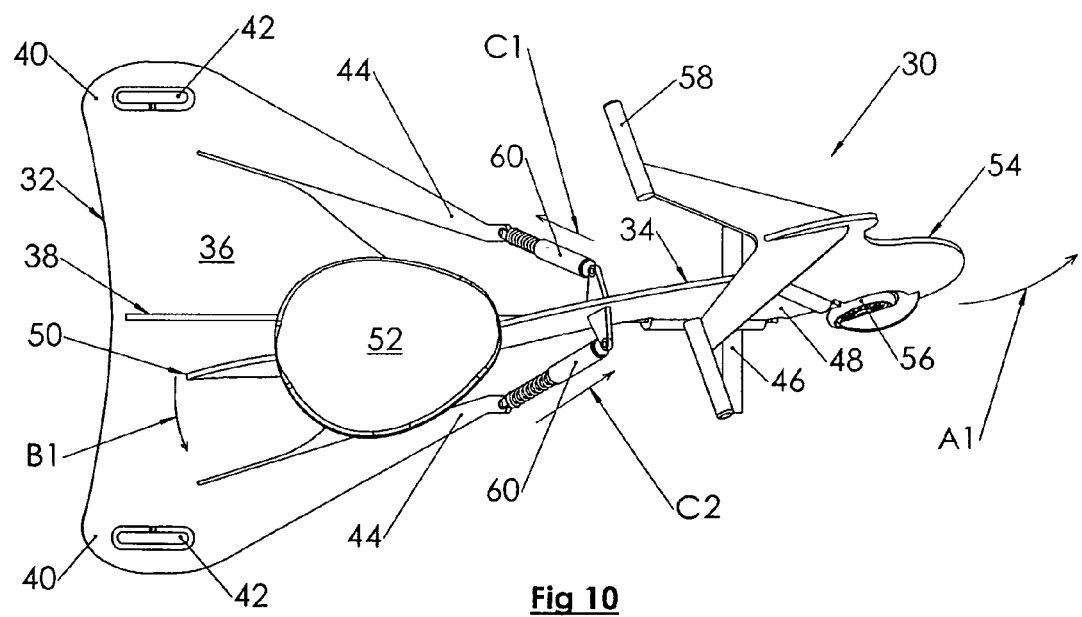
FIG. 10 shows a top view of the vehicle of FIG. 3 making a left turn.

In operation, a rider (not shown) sits in the seat 52 to operate the vehicle 30, which can move under the power of an external force such as gravity (e.g., coasting downhill) or a push. As mentioned previously, the vehicle 30 could also be provided with its own propulsion means. When the vehicle 30 is traveling in a straight direction, represented by arrow A, the support arm 50 will assume its equilibrium position in which the support arm 20 overlies the upright section 38 of the rear frame 32 in an equilibrium plane (i.e., the plane of the paper in FIG. 3). However, if the vehicle 30 turns from its straight path to move along a curved path, centrifugal force will cause the support arm 50 to pivot or swing about the axis of rotation X-X outward or away from the turn. For example, if the rider turns the vehicle 30 to the left, as depicted by arrow $A_1$ in FIGS. 9 and 10, the support arm 50 will swing to the right of the equilibrium plane (arrow $B_1$), meaning that the seat 52, and the rider sitting in the seat 52, will be laterally displaced to the right relative to the rear frame 32. As the support arm 50 swings to the right, the main section 48 of the forward frame 34, which is positioned in front of the axis of rotation X-X, will swing to the left. This will cause the left spring assembly 60 to be shortened (arrow $C_1$) and thereby further compress its spring 66. At the same time, the right spring assembly 60 will be lengthened (arrow $C_2$). The increased axial force of the left spring assembly 60 will act on the left mounting flange 44 of the rear frame 32, while the right spring assembly 60 will exert less force on the right mounting flange 44. This force imbalance will exert a torque on the rear frame 32 that pushes the left rear wheel downward against the ground, thereby working to maintain wheel contact and help stabilize the vehicle 30 during the turn. Everything is reversed in the event of a turn to the right. The spring assemblies 60 are just one possible means for transferring a useful, stabilizing torque to the rear frame 32 in response to the support arm 50 swinging away from a turn. Other means, such as torsion bars and elastic bands by way of example, can also be used to create the desired torque. Furthermore, while the spring assemblies 60 are shown as being connected to the forward frame 34 forward of the axis of rotation X-X, other points of connection including rearward of the axis of rotation X-X could be employed.

In addition to being laterally displaced to the left or the right, the seat 52 and the rider will also be displaced vertically because of the axis of rotation X-X being inclined. This means that when the support arm swings outward away from the turn, the seat 52 will be tilted inward or in the direction of the turn. In other words, if the rider turns the vehicle 30 to the left, the support arm 50 and the seat 52 will swing to the right of the equilibrium plane, but the seat 52 will be titled from a horizontal orientation towards the left. This will cause the rider to automatically lean into the turn, with more of the rider's weight being carried by the left footrest 46, and thereby help stabilize the vehicle 30. This arrangement also enhances rider comfort by reducing lateral forces acting on the rider relative to the seat 52. Furthermore, when the vehicle 30 completes the turn and resumes traveling in a straight direction (or comes to rest), gravity will cause the support arm 50, the seat 52 and the rider to return to the equilibrium position. As the support arm 50 returns to its equilibrium position, the spring assemblies 60 will function to dampen the natural tendency of the support arm 50 to oscillate or swing back and forth about the equilibrium point.

While specific embodiments of the present invention have been described, it should be noted that various modifications thereto can be made without departing from the spirit and scope of the invention as defined in the appended claims.

What is claimed is:

1. A stabilizer for vehicles, said stabilizer comprising:
   a base;
   a shaft mounted to said base and defining an axis of rotation, wherein said axis of rotation defines an acute angle relative to said base;
   an arm attached at a first end thereof to said shaft at an outer end of said shaft;
   a mass attached to a second end of said arm below said axis of rotation, wherein when said stabilizer moves in a turn, centrifugal force acts on said mass and causes said arm to freely swing about said axis of rotation in a direction away from the turn; and
   an actuator attached to said arm, wherein said actuator is displaced to do work when said arm swings.

* * * * *